(12) United States Patent  
Chan et al.

(10) Patent No.: US 7,360,074 B2
(45) Date of Patent: Apr. 15, 2008

(54) METHOD FOR REMOTE FLASHING OF A BIOS MEMORY IN A DATA PROCESSING SYSTEM

(75) Inventors: Sen-Ta Chan, Taipei Hsien (TW); Yi-Hsun Chen, Taipei Hsien (TW); Chao-Sheng Hsu, Taipei Hsien (TW); Yi-Chang Wu, Taipei Hsien (TW); Wen-Pin Huang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 201 days.

(21) Appl. No.: 10/907,341

(22) Filed: Mar. 30, 2005

(65) Prior Publication Data

US 2005/0223207 A1   Oct. 6, 2005

(30) Foreign Application Priority Data

Apr. 6, 2004   (TW) .............................. 93109435 A

(51) Int. Cl.
G06F 9/00 (2006.01)
(52) U.S. Cl. ............................................. 713/2; 713/1
(58) Field of Classification Search .................... 713/1, 713/2
See application file for complete search history.

(56) References Cited

U.S. PATENT DOCUMENTS 5,230,052 A  *  7/1993  Dayan et al. .................. 713/2
5,844,986 A      12/1998  Davis .......................... 713/187
6,272,628 B1 *  8/2001  Aguilar et al. ................. 713/2
6,272,629 B1     8/2001  Stewart ......................... 713/2
6,560,706 B1 *  5/2003  Carbajal et al. ............. 713/155
6,718,461 B1 *  4/2004  Ewertz ......................... 713/1
6,718,464 B2 *  4/2004  Cromer et al. ................. 713/2
6,993,648 B2 *  1/2006  Goodman et al. ............. 713/2
7,178,019 B2 *  2/2007  Lam .............................. 713/2

FOREIGN PATENT DOCUMENTS

TW      375707     12/1999
TW      448406      8/2001

* cited by examiner

Primary Examiner—Chun Cao
(74) Attorney, Agent, or Firm—Jianq Chyun IP Office

(57) ABSTRACT

A method and apparatus thereof for flashing a BIOS of a data processing system remotely are provided. A BIOS flash instruction is given remotely from a remote console, transmitted to a microprocessor and a corresponding storage media of the data processing system via network, where the microprocessor is irresponsible for operating system. A BIOS image file is identified correct before performing BIOS of a system microprocessor that is responsible for operating system, where the system microprocessor is usually CPU. BIOS is remotely flashed with this method and apparatus, and since flash operation is performed independently of the operating system of the data processing system, BIOS re-flash can be performed and data processing system can be rebooted even when flash operation is failed or operating system is disable.

3 Claims, 8 Drawing Sheets

METHOD FOR REMOTE FLASHING OF A BIOS MEMORY IN A DATA PROCESSING SYSTEM

CROSS-REFERENCE TO RELATED APPLICATION

This application claims the priority benefit of Taiwan application serial no. 93109435, filed on Apr. 6, 2004.

BACKGROUND OF THE INVENTION

1. Field of Invention

The present invention relates to a method for flashing of a BIOS memory in a data processing system, and more particularly, to a method for remote flashing of a BIOS memory that is complied with various of operating systems, and manages to re-flash with BIOS flash failed.

2. Description of the Related Art

Generally speaking, in order to flash a data processing system, for example, BIOS flash for a computer, the flashing operation has to be performed under normally running Operating System. In the case when the Power On Self Test (POST) is not successfully passed or the Operating System is not normally operated, remote BIOS flash is not feasible.

Referring to FIG. 1, a schematic flow chart illustrating a method for flashing a computer BIOS according to prior art technology is depicted. When the BIOS flashing starts to work (step 110), the data processing system is booted first (step 102), and the Power On Self Test (POST) is subsequently performed (step 104). If the POST is successfully passed (step 101), the process moves to a step of "entering the Operating System (e.g. DOS, Microsoft Windows, Linux, etc.) (step 106). After the system has successfully entered the Operating System, if BIOS flash is requested by the remote console (step 103), a BIOS image file is transmitted firstly (step 108). Then, it is determined whether the BIOS image file is correct or not (step 105) and the BIOS is flashed by running a flash program (step 112). The system is rebooted after the flash operation is completed (step 114). If the BIOS image file is incorrect, a notification is sent to the remote console (step 116) and the process is terminated (step 120). On the other hand, if the remote user does not request to flash the BIOS, the process is terminated (step 120). Therefore, in the prior art, in case the BIOS flashing operation starts whereas the POST fails, the Operating System fails to work, meaning remote BIOS flash cannot be performed.

Regarding hardware configuration of the prior art technology, referring to the block diagram illustrating BIOS flash operation BIOS as shown in FIG. 5. In the diagram, a remote console 502 is used to send a message through an Ethernet 504 and a network interface card 506, wherein the message indicates that the remote console opts to flash the BIOS. A system processor 522 processes such message with the memory space configured in the system flash memory 524 and the system random access memory (RAM) 526 for flashing the system BIOS. According to a step of receiving a remote message to flash BIOS, the message between the data processing system and the network is transmitted through a channel provided by the system processor 522, thus BIOS can be successfully flashed only when the Operating System is normally operated. On the other hand, if the system suffers from power surge or some other reason that fails BIOS flash, the system processor 522 does not manage to reboot after BIOS flash failure, thus the remote console 502 is not able to perform BIOS flash via the network.

SUMMARY OF THE INVENTION

According to one aspect of the present invention, a method for remotely flashing BIOS is provided, wherein disability of remote BIOS re-flash caused by a BIOS flash failure is solved.

According to another aspect of the present invention, a method for flashing BIOS is provided, wherein a BIOS image file to be flashed provided remotely, bridged with a microprocessor yet not performed with the operating system thereof, manages to directly or indirectly perform BIOS flash and system reboot.

In accordance with the above aspects of the present invention, a data processing system is provided, for remotely flashing a rewritable memory. The data processing system includes a remote console, a first microprocessor module, a second microprocessor module, a network, and a network interface. Wherein, after transmitted through the network and converted by the network interface, the flashing instruction and the flashing content provided by the remote console are received and executed by the first microprocessor module which is connected to the network interface, and a subsequent process is performed to flash the rewritable memory. In the present invention, the rewritable memory, being rewritable BIOS memory of the CPU, for example, is disposed with the second microprocessor module. In such case, the rewritable BIOS memory can be directly flashed by the first microprocessor module without performance of the second microprocessor module. If the first microprocessor module does not serve to directly flash the rewritable BIOS memory function, an alternative method can be used to indirectly flash the rewritable memory via the BIOS boot block by connecting the second microprocessor module thereto. The first microprocessor module of the present invention includes a first microprocessor and a first register. Usually, the first microprocessor is a microprocessor other than the CPU of the computer, and the first register is a memory corresponding to the first microprocessor, e.g. a flash memory, a RAM, etc. In the present invention, a remote instruction and flashing content are received via the network for BIOS flash of the CPU, where the first microprocessor serves as a bridge along with the operation of the first register., Since the first microprocessor being responsible for performing memory flash and the second microprocessor and the second register thereof to be flashed are independent, the rewritable memory of the second microprocessor can be flashed either directly or indirectly by the first microprocessor, which is irrelevant to the operating system. Even memory flash fails, a flash instruction is able to be remotely re-performed via the first microprocessor by the remote console until the operating system resumes properly.

Furthermore, a direct method for flashing the rewritable memory of the second microprocessor without operation of the second microprocessor is provided as well in the present invention.

DESCRIPTION OF THE EMBODIMENTS

The present invention provides a remote console that enables a system's BIOS to be flashed remotely, and more particularly, provides a method for re-flashing BIOS if BIOS flash ever fails. The failure to flash the BIOS properly could lead to a system failure. A BIOS image file to be flashed is provided remotely from the remote console of the BIOS flashing system, where a microprocessor serves as a bridge and bypasses the operation system, before BIOS is successfully flashed and the data processing system is successfully rebooted.

An indirect method for remotely flashing BIOS is provided in the present invention, where a microprocessor serves as a bridge. Since the microprocessor includes a data register, e.g. flash memory, RAM, etc., when a BIOS flash is instructed by a remote administrator, the microprocessor remotely flashes the BIOS thereof.

A direct method and an indirect method of remotely flashing BIOS are provided according to technology of the present invention. Wherein the direct method, the microprocessor and the rewritable memory of the system are coupled with an interface, where the microprocessor manages to flash the BIOS at arbitrary time. If the system is without the interface, an alternative indirect method mentioned above is triggered to flash the BIOS. According to the indirect method for flashing BIOS in the present invention, BIOS is flashed with the code embedded in the BOOT block thereof, thus BIOS is flashed before POST is terminated. Moreover, the code embedded in the BOOT block is non-versatile after the system is fabricated, the BOOT block is never vulnerable and re-flash of the BIOS is secured.

Figure 1:
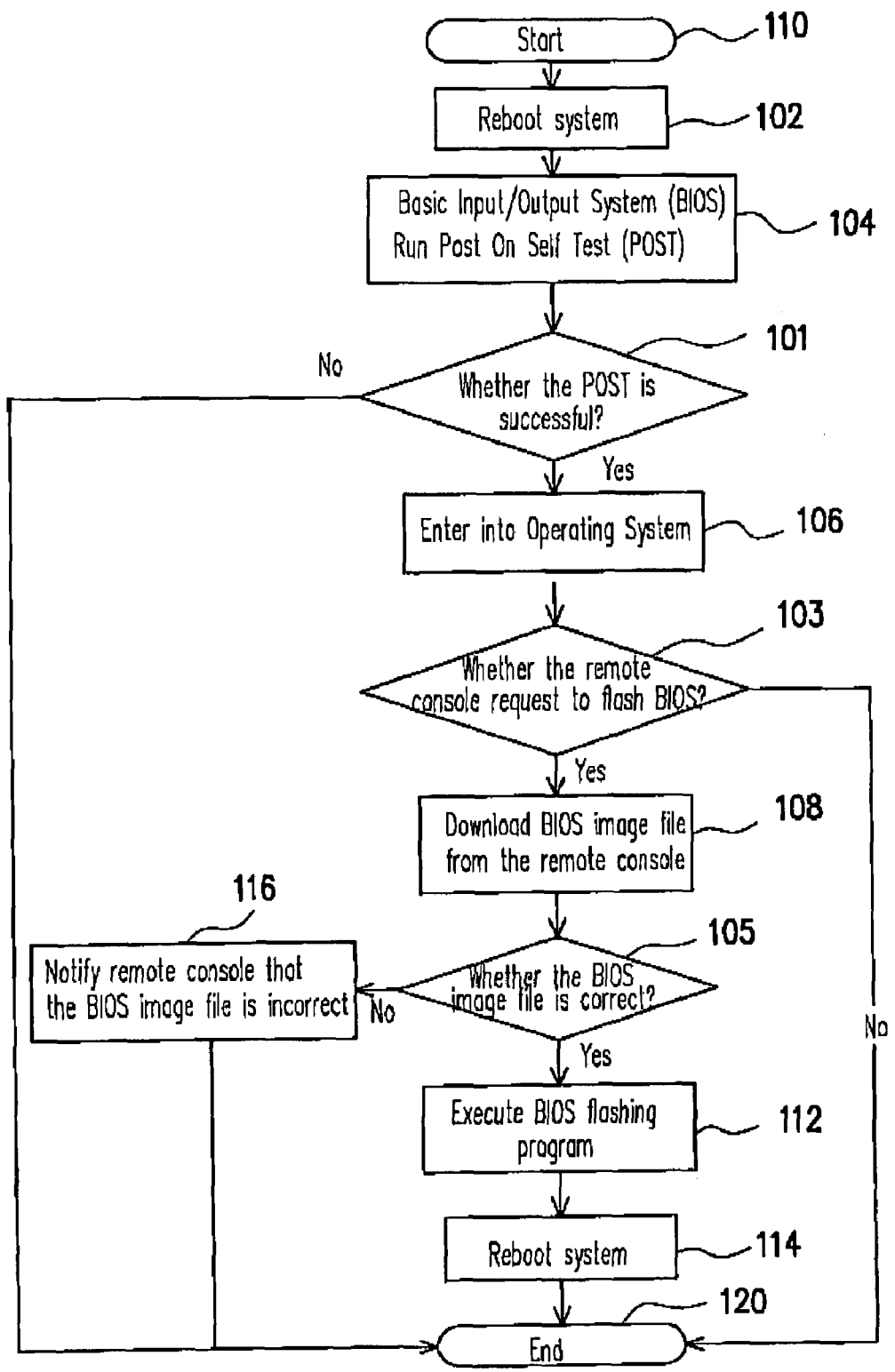
FIG. 1 is a flow chart illustrating a remote BIOS flashing operation according to the prior art.
Figure 2:
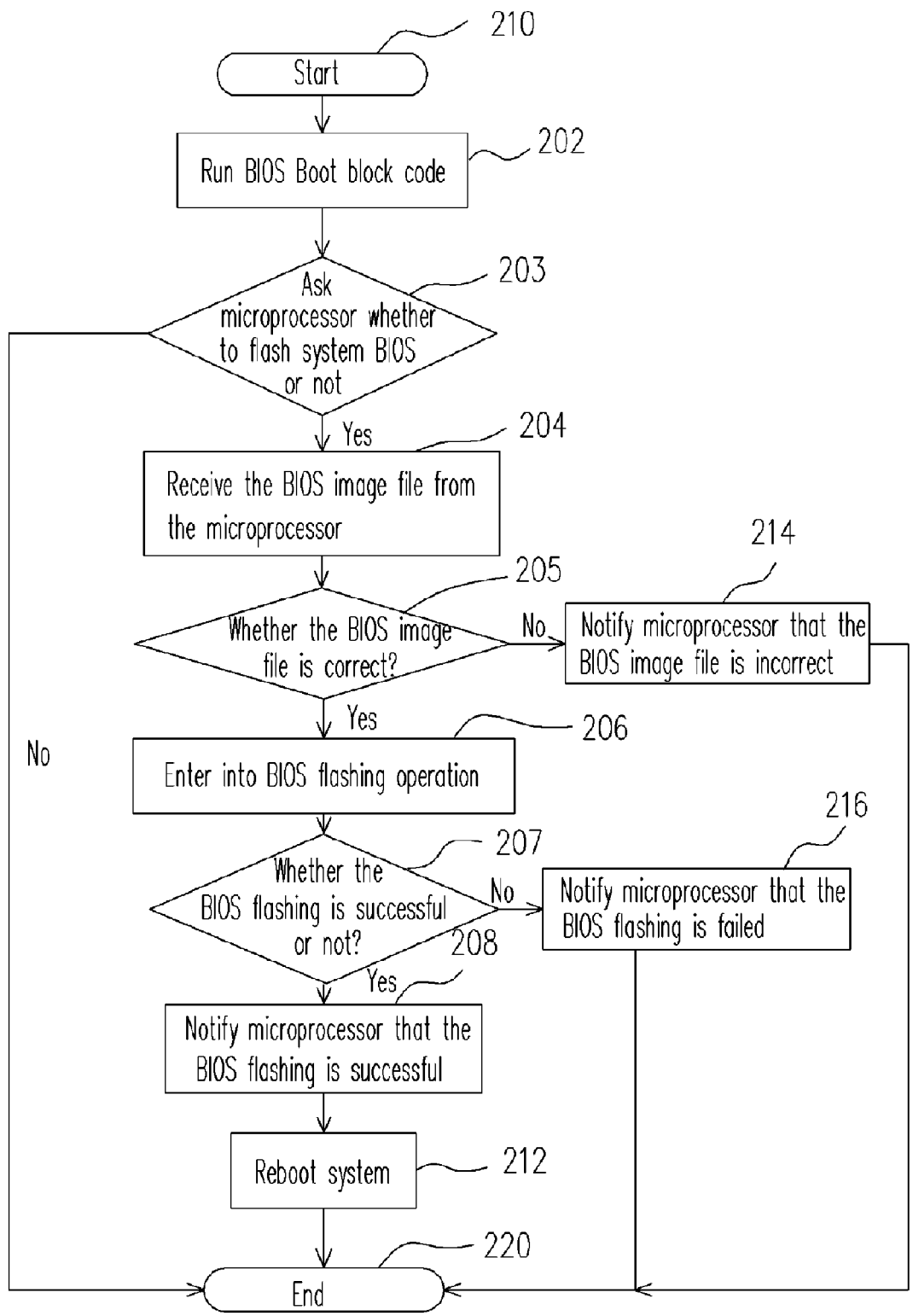
FIG. 2 is a flow chart illustrating an indirect BIOS flashing operation according to an embodiment of the present invention.

Referring to FIG. 2, a flow chart of an indirect BIOS flashing method according to an embodiment of the present invention is illustrated. The system BIOS is a rewritable memory for storing a boot block code, which serves to run BIOS procedures at each time the system is rebooted. In the remote flashing method disclosed by the present invention, the BIOS operating procedure is depicted in FIG. 2. First, when the BIOS boot block code is being executed (step 202), if BIOS flash is requested by the remote console (step 203), a BIOS image file is read from the register associated with the microprocessor (step 204). Wherein the BIOS image file is then transmitted through the network and the network interface from the remote console. After reading procedure of the BIOS image file is completed, the BIOS image file is examined whether it is correct or not (step 205). If incorrect, the microprocessor is informed of incorrect BIOS image file (step 214). If correct, the BIOS flashing is then performed (step 206). Microprocessor is informed of the flash procedure whether the process is successful (step 208) or failed (step 216), whereas system reboot (step 212) is performed when succeeded.

Figure 3A:
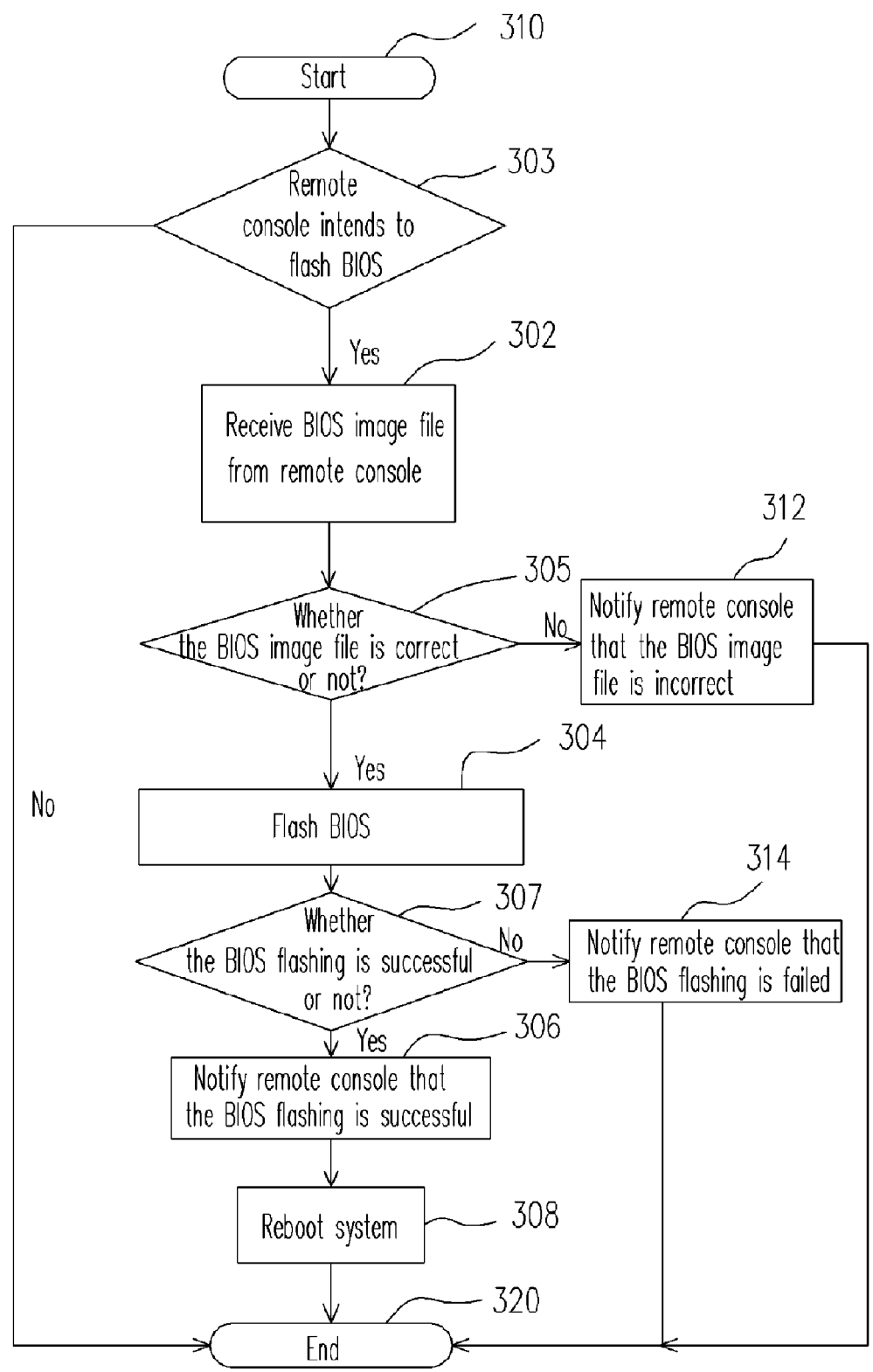
FIG. 3A is a flow chart illustrating a direct microprocessor operation according to an embodiment of the present invention.
Figure 3B:
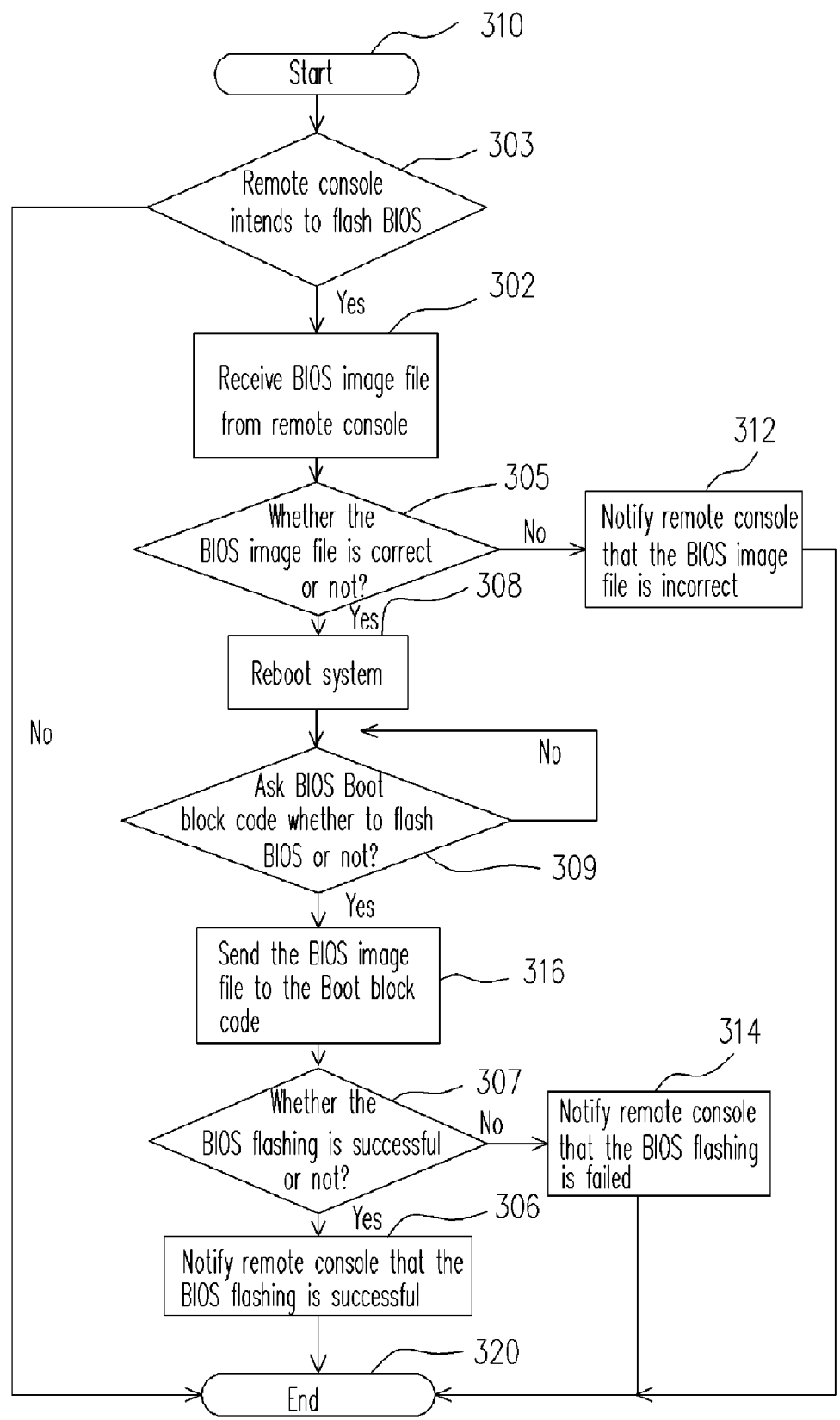
FIG. 3B is a flow chart illustrating an indirect microprocessor operation according to an embodiment of the present invention.

In the present invention, when BIOS flash is to be remotely flashed by the system administrator, a BIOS flashing instruction is issued by a remote console to the microprocessor of the system, where BIOS is to be flashed remotely thereof. BIOS is flashed directly as the microprocessor receives the instruction(referring to FIG. 3A), or is halted until communication with the BIOS boot block performed (referring to FIG. 3B). Referring to FIG. 3A, determining whether BIOS flash instruction is received by the microprocessor or not (step 303). If the instruction is received, the microprocessor serves as a bridge to extract a BIOS image file (step 302). As the BIOS image file is extracted and the image file is determined correct (step 305), a confirmation message is sent to the microprocessor, and the procedure proceeds to the step of BIOS flash (step 304). Thereafter, determining whether the BIOS flashing is successful or not (step 307), and returning a success or failure message to the remote console according to the result (step 306 and 314). If the flash is successful, the system is rebooted (step 308), and direct microprocessor procedure for BIOS flash is terminated (step 320). Whereas for indirect microprocessor operation, referring to FIG. 3B. What is different from the direct method is rebooting the system (step 308) right after determining whether BIOS image file is correct (step 305), and halting transmission of BIOS image file to the boot block code (step 316) until the BIOS boot block requests for BIOS re-flash (step 309). As the boot block code returns BIOS flash results, a successful (step 306) or failed (step 314) message is returned to the remote console, and the microprocessor procedure is terminated (step 320).

Figure 4:
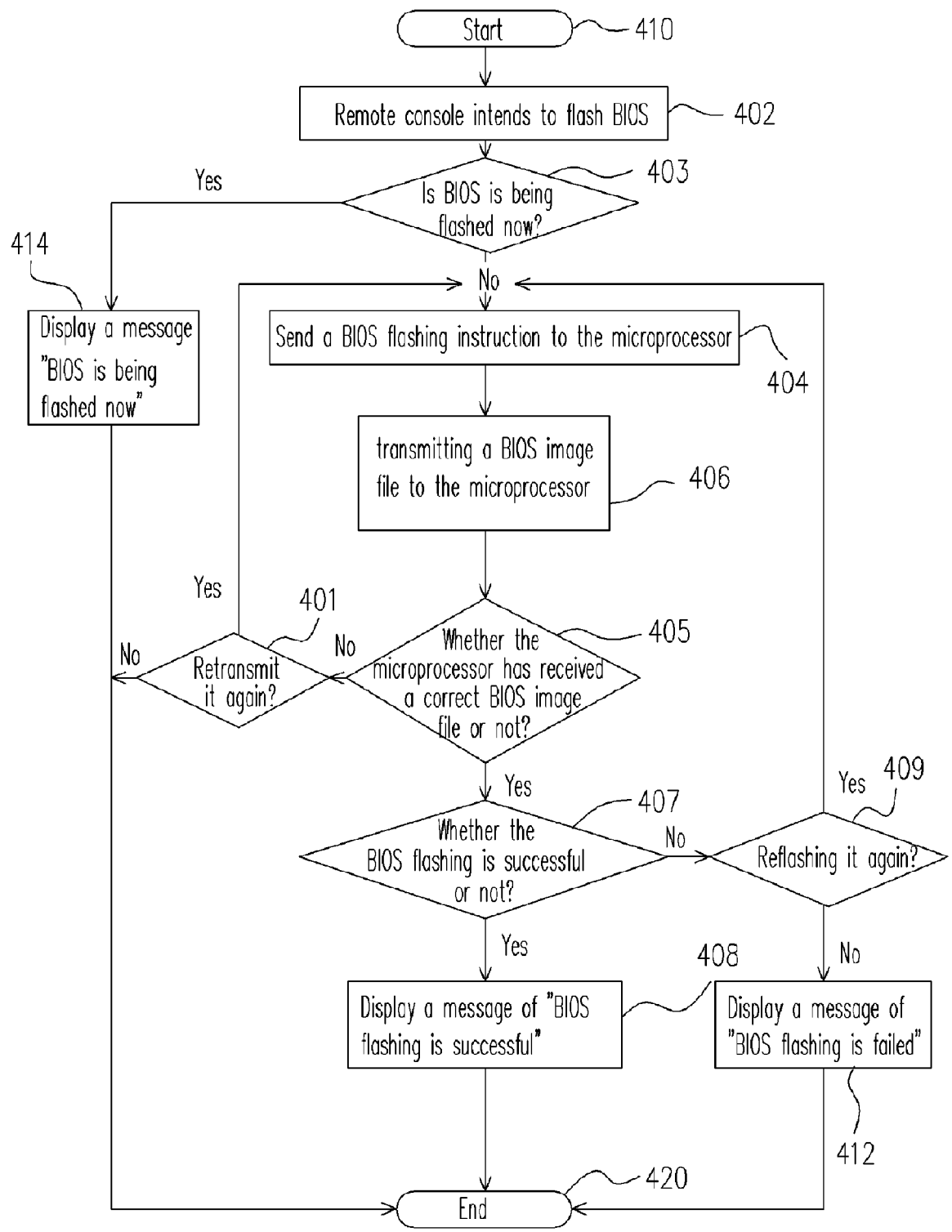
FIG. 4 is a flow chart illustrating a remote console operation according to an embodiment of the present invention.
Figure 5:
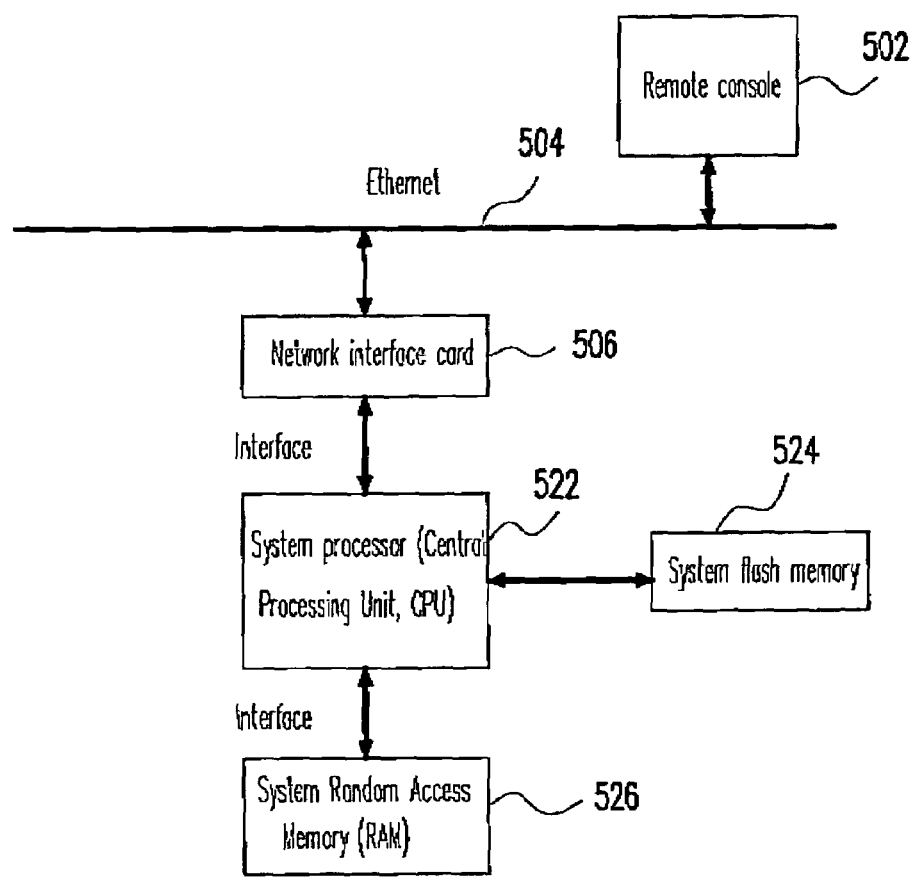
FIG. 5 is a schematic block diagram illustrating a system of BIOS flash according to the prior art.

FIG. 4 is a flow chart illustrating a remote console procedure according to an embodiment of the present invention, depicting either the direct or indirect method. As the remote console requests to flash the BIOS remotely (step 402), if BIOS flash is found to be performing (step 403), a message of "BIOS is flashing" is displayed (step 414). If the BIOS flashing is not found to be performing, a flashing instruction is sent to the microprocessor (step 404). Then, transmitting a BIOS image file to the microprocessor from the remote console (step 406), and determining whether the microprocessor receives the BIOS image file correctly or not (step 405). As the BIOS image file is transmitted completely, determining whether the BIOS flash is successful or not (step 407). If successful, a message of "BIOS flashing successful" is displayed (step 408). If failed, either retrial of BIOS flash is performed (step 409), or a message of "BIOS flash failed" is displayed (step 412). If the microprocessor receives an incorrect BIOS image file, determining whether to transmit again (step 401).

Figure 6A:
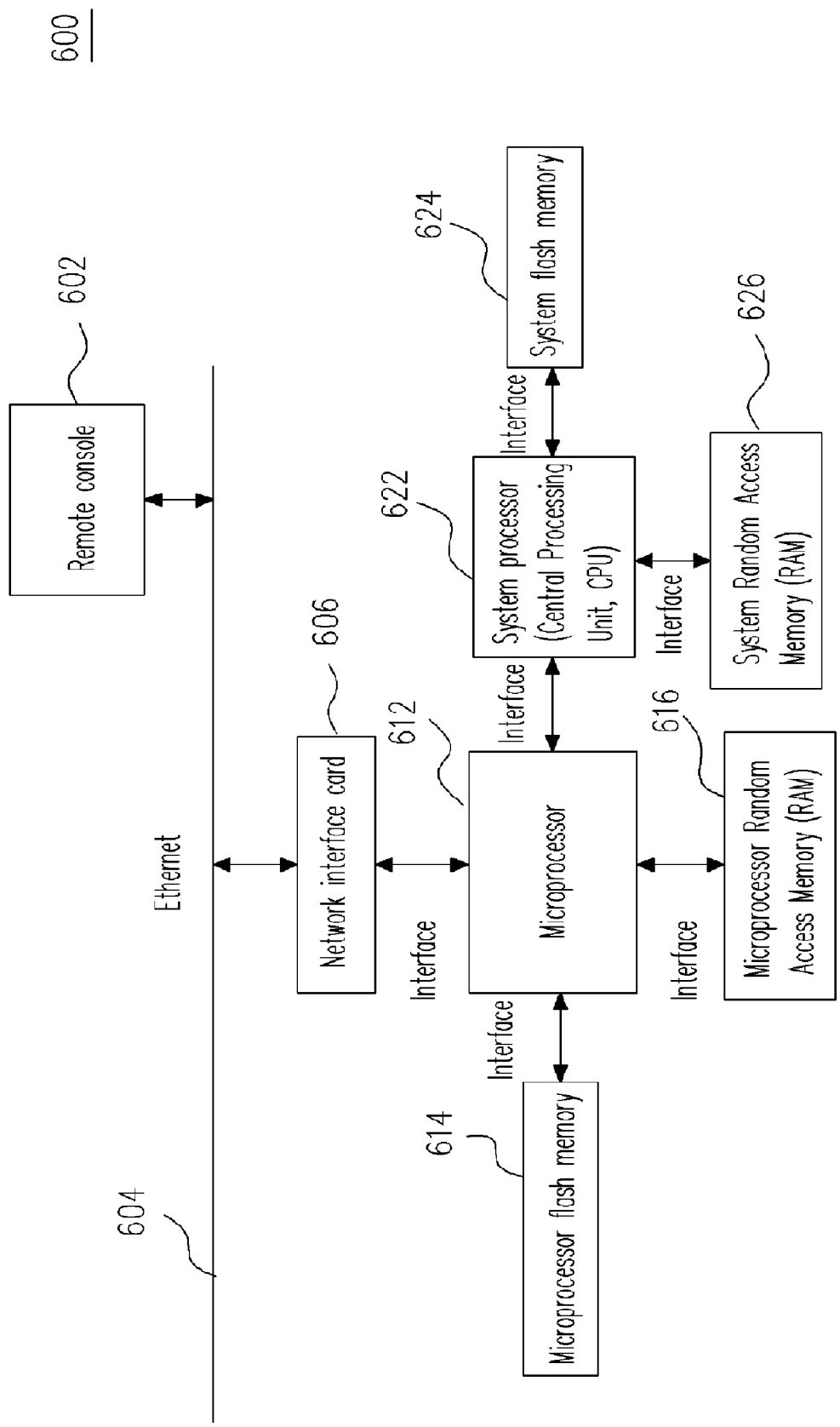
FIG. 6A is a schematic block diagram illustrating an indirect remote BIOS flashing system according to an embodiment of the present invention.
Figure 6B:
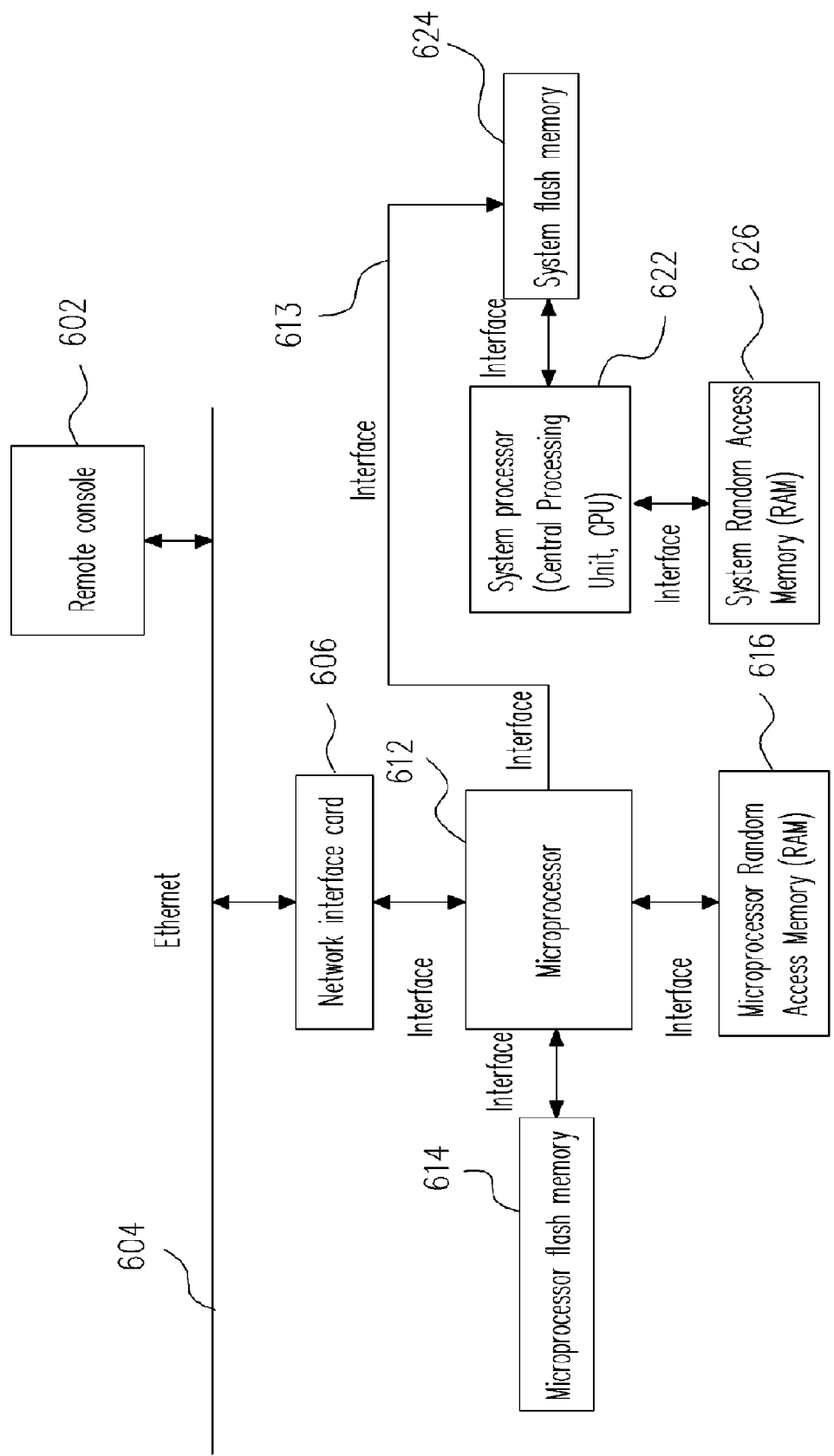
FIG. 6B is a schematic block diagram illustrating a direct remote BIOS flashing system according to an embodiment of the present invention.

Referring to FIG. 6B, a schematic block diagram of a direct remote BIOS flash system according to an embodiment of the present invention is illustrated. In the block diagram of the system configuration according to one embodiment of the present invention, data communication and BIOS flash are performed by another microprocessor 612 instead of being performed by the system microprocessor that is responsible for operating system 622, i.e. CPU. The program code of the microprocessor 612 is stored in the flash memory 614 of the microprocessor, whereas the BIOS image file received from the remote console 602 is stored in the RAM 616 of the microprocessor. The microprocessor and the system flash memory are coupled with an interface

613, such that BIOS flash is performed even when the system microprocessor 622 is disable, or the operating system is disable.

Referring to FIG. 6A, a schematic block diagram of an indirect remote BIOS flashing system according to an embodiment of the present invention is illustrated. The difference between system configuration herein and that of the direct remote BIOS flash system is that the microprocessor 612 and the system flash memory 624 are not interfaced directly. Whereas remote BIOS flash is performed via system microprocessor (CPU) 622, system DRAM 626, and the BIOS boot block 624 embedded with the system flash memory. That is, even the operating system is disable, BIOS flash is still performed as desired.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

What is claimed is:

1. A method for flashing a Basis Input/Output System (BIOS), being performed when a BIOS memory is not under flashing, the method comprising:

extracting a BIOS image file from a first microprocessor, wherein the BIOS image file is transmitted from a remote console, and is stored in a first register associated with the first microprocessor;

determining whether the BIOS image file is correct or not;

if the BIOS image file is correct, informing the first microprocessor that the BIOS image file is correct;

if the BIOS image file is incorrect, the first microprocessor is requested by the remote console for re-sending the BIOS image file;

proceeding to a flashing operation, wherein the BIOS image file is written to the BIOS memory with the first microprocessor via the second microprocessor along with a corresponding second register;

determining whether the flash operation is successful or not;

sending a message indicating the flash operation is successful or failed to the first microprocessor; and rebooting the BIOS.

2. The flashing method of claim 1, wherein the second microprocessor is a Central Processing Unit (CPU).

3. The flashing method of claim 1, further comprising executing a Power On Self Test (POST) after the system is rebooted.

* * * * *